United States Patent [19]

Fuchs et al.

[11] Patent Number: 4,881,800
[45] Date of Patent: Nov. 21, 1989

[54] TWO-AXIS MIRROR STABILIZATION ASSEMBLY

[75] Inventors: Charles R. Fuchs, Wayne; David A. Haessig, Jr., Towaco; David L. Heckathorn, Wayne; Jordan S. Kass, Wayne; Peter Lindsay, Hardyston Township, Sussex County; Joseph J. Volpe, Rockaway, all of N.J.

[73] Assignee: Plessey Electronic Systems Corp., Wayne, N.J.

[21] Appl. No.: 194,367

[22] Filed: May 16, 1988

[51] Int. Cl.$^4$ .............................................. G02B 27/64
[52] U.S. Cl. ...................................... 350/500; 73/504; 74/5.22; 364/453
[58] Field of Search ..................... 350/500; 354/70, 72; 358/222; 73/504; 244/175; 364/453; 74/5.22, 5.6 R, 5 R

[56] References Cited

U.S. PATENT DOCUMENTS

| | | | |
|---|---|---|---|
| 3,380,310 | 4/1968 | Tommaso et al. | 354/70 |
| 4,016,469 | 4/1977 | Lanni et al. | 73/504 |
| 4,062,126 | 12/1977 | O'Hara et al. | 74/5.22 |
| 4,068,538 | 1/1978 | Butler et al. | 74/5.6 A |
| 4,662,727 | 5/1987 | Griffin | 356/149 |

FOREIGN PATENT DOCUMENTS 2212306  9/1973  Fed. Rep. of Germany ...... 350/500

OTHER PUBLICATIONS

Haessig, Jr., et al. "Modern Control Methods Applied to a Line-Of-Sight Stabilization and Tracking System", American Control Conference, 6/1987 pp. 29–36.

Primary Examiner—Rodney B. Bovernick
Assistant Examiner—R. D. Shafer
Attorney, Agent, or Firm—David L. Davis

[57] ABSTRACT

To stabilize the line-of-sight of an optical image relative to a commanded line-of-sight, a stabilization system consisting of a mirror having two limited degrees of freedom, a two axis gyroscope having its two sensitive axes perpendicular to the LOS, a pickoff sensor feeding back mirror angular position, servo compensators that provide mirror torque commands to a two axis mirror torquer, and the electronic hardware that ties these components together is used.

17 Claims, 5 Drawing Sheets

TWO-AXIS MIRROR STABILIZATION ASSEMBLY

FIELD OF THE INVENTION

The present invention relates to a mirror stabilization subassembly for an optical system.

BACKGROUND OF THE INVENTION

A vehicle such as an F-16 fighter aircraft in flight will vibrate, to some small degree, in response to aerodynamic and dynamic loads which excite the various bending modes of the vehicle. Equipment attached to the vehicle is subjected to this same vibration and it is necessary in some cases therefore to isolate this equipment or a variable associated with this equipment from the vibration in order to improve the performance of the equipment. In an optical system (the type of system to which the present invention applies) vehicle vibrations cause the optical image to blur and/or appear jittery. One feature of the present invention is that it stabilizes the image being captured by equipment mounted on a vibrating surface. This is accomplished by controlling the orientation of a mirror so as to reduce the unwanted motion of the image. Previous optical systems used fixed mirrors and slow response servo control systems having limited performance for reducing vibration.

BRIEF DESCRIPTION OF THE PRESENT INVENTION

The present invention, a two axis image stabilizer, was developed as part of a subsystem of an image capture and display system designed to give an aircraft pilot an enhanced visual capability. (The present invention is not limited to that application, however.) The image being captured by this system is displayed on a screen attached to the pilot's helmet. Two gimbals are used to effect large changes in the orientation of the line-of-sight (LOS), i.e., the vector normal to and passing through the center of the image being captured by the system. The position of the pilot's helmet relative to the cockpit is a measurement which serves as a a command input to a control system which causes the system's LOS to track the pilot's LOS. In this way the optical system thereby provides proper registration between the pilot's normal image and the image displayed on the screen on his helmet.

The purpose of the present invention, the image stabilization subsystem, is to reduce (i.e., reject) image blurring vibrations from the LOS, thereby greatly improving the quality of the image being captured. However, at the same time, the stabilization subsystem cannot degrade the main purpose of the total system, which is to cause the system's LOS to track the pilot's LOS. The stabilization subsystem must therefore accomplish two tasks simultaneously, i.e., rejecting vibrations while tracking pilot LOS motion. This is accomplished by defining frequency regimes in which these two types of motion reside. Vehicle vibrations are those motions that fall in the high frequency regime (i.e., above 5Hz) and pilot helmet motions are those motions that fall in the low frequency regime (i.e., below 5Hz).

The present invention, the image stabilization subsystem, is attached to the inner of the two gimbals. The base of the outer gimbal is attached to the aircraft. The stabilization subsystem is therefore exposed to vehicle motion and the motion of the gimbals as they move in response to the pilot's helmet motion. The total motion is separated into four parts: vehicle maneuver motion, vehicle vibration, gimbal motion in response to pilot helmet motion, and gimbal motion caused by imperfections in the hardware. A key feature of the present invention is the way that it reacts to each of these four motions. The vehicle vibrational motions cause the image to blur and appear jittery. The stabilization subsystem therefore rejects these motions so that the image is clear and stable (i.e., not moving). Gimbal motion caused by imperfections in the hardware, referred to as gimbal jitter, has the same effect on image clarity as vehicle vibration, causing it to blur and jitter. The stabilization subsystem therefore also rejects these motions from the image. Vehicle maneuver motion and gimbal motion in response to pilot helmet commands are motions that the stabilization subsystem must track. The stabilization subsystem does not remove or reject these motions from the LOS but causes the LOS to follow them. It is necessary to track these motions so that the inertial orientation of the system's LOS is aligned with the inertial orientation of the pilot's LOS. Note that the orientation of the system's LOS is defined as the inertial position of the vehicle due to vehicle maneuvers plus the position of the gimbals relative to the vehicle, whereas the pilot's LOS is defined not by the pilot's eyes but by the orientation of the pilot's helmet.

The present invention image stabilization subsystem includes a mirror that is mounted to a flexible hinge which in turn is attached to a rigid block. (In the application described above the block is attached to a gimbal set that is mounted to a vehicle.) This hinge assembly provides two axes of limited freedom for the mirror. Also included are pickoff sensors (which measure angular position), a torquer, and a gyroaccelerometer. These components provide input signals to a digitally implemented controller which, in accordance with properly designed compensators therein, generates torquer commands, torques that are applied to the mirror to position the mirror accordingly.

The compensators are designed using well known modern control theory techniques. Using these techniques, the design process begins with the development of models of the process to be controlled. These design models are not derivatives of the modern control approach but are a starting point to which the modern control techniques are applied. The design models are unique therefore to this application and are thus considered to be a key element of the present invention.

Insofar as the image stabilization assembly has two degrees of freedom, two design models—one for each axis—are used. Each design model is used to design a separate compensator. Each compensator has three inputs, variables that are either measured, as with the pickoff angle and the gyro rate, or derived, as with the commanded rate which is derived from the pilot helmet commands. The output from each compensator is a torque which is applied to the appropriate axis of the mirror. As a result, a feedback loop is effected.

BRIEF DESCRIPTION OF THE DRAWINGS

The above-mentioned objects and advantages of the present invention will be more clearly understood when considered in conjunction with the accompanying drawings, in which.

DETAILED DESCRIPTION

Figure 1:
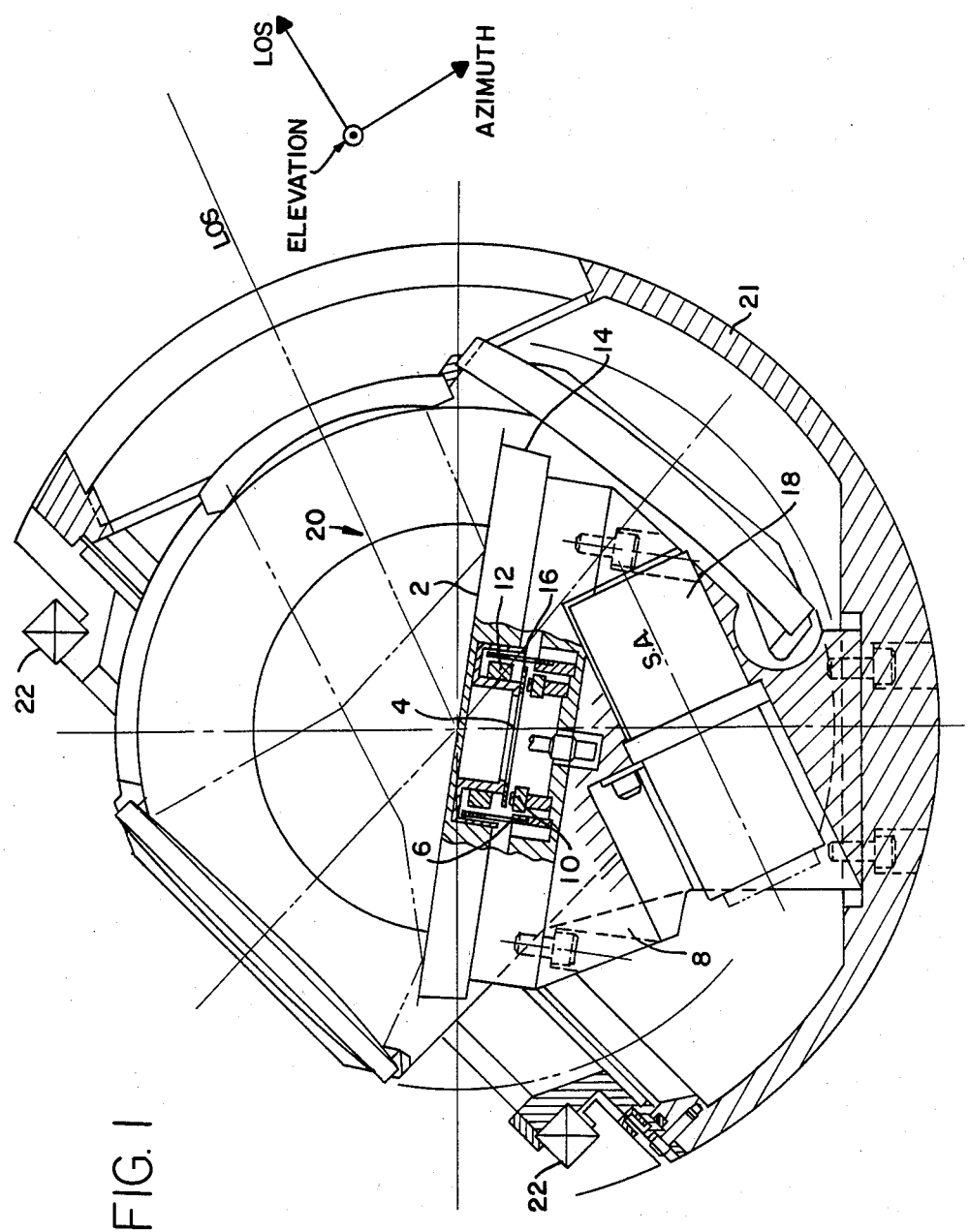
FIG. 1 is a plan view of an image stabilization subassembly according to the present invention; LOS, elevation and azimuth axes are defined on this figure for reference.

The physical structure of the image stabilization subassembly according to this invention is shown in the plan view of FIG. 1. As illustrated, a mirror 2 is mounted onto a flexure hinge 4. Hinge 4 provides two axes of limited freedom and a small amount of restoring torque to mirror 2. The end portion of flexure hinge 4, as well as two pairs of torquer coils 6, is attached to a rigid sensor block 8. Also attached to block 8 are two pairs of proximity sensing pickoff coils 10. The pickoff and torquer coils are positioned concentrically with flexure hinge 4 such that the two pairs of torquer coils 6 react with a permanent magnet ring 12, which is coupled to the underside of mirror 2 within mirror base 14. Similarly, pickoff coils 10 react with a return path coil 16, also mounted to the base of mirror 2.

A gyro 18 is rigidly mounted onto sensor block 8 so that its spin axis is along the line-of-sight (LOS) to be stabilized, thereby providing rate information about two axes perpendicular to the LOS. The control system of this image stabilization subassembly 20, to be discussed infra, utilizes the torquer coils 6 to alternately push and pull magnetic ring 12, thereby causing mirror 2 to tilt via flexure hinge 4. The pickoff coils 10, of course, provide the mirror position feedback Image stabilization subassembly 20 is mounted rigidly to the inner gimbal 21 of a pair of gimbals. The inner gimbal 21 in turn is mounted via the bearings 22 to the outer gimbal of the pair (not shown). Angular and translational alignment of the line of sight is facilitated by provisions for adjusting the position of subassemble 20 relative to the inner gimbal 21. Further not shown but also associated with the subassembly are pre-amplifiers and resistor bridge circuits mounted onto sensor block 8 and three axis balancing weights on mirror 2 for adjusting the center of gravity of the mirror. Distortion of mirror 2 due to thermal expansion is eliminated by a mounting strain relief method, well documented in gyroscopes assembly procedures.

Figure 2:
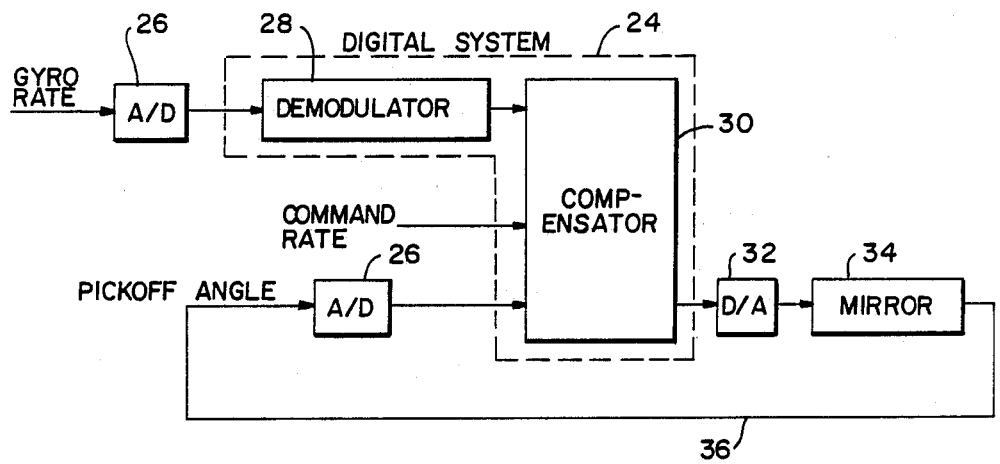
FIG. 2 is a simplified block diagram giving an overall view of the image stabilization subassembly according to the present invention.

The just mentioned control system is represented by the block diagram of FIG. 2 where it is shown that three input signals—designated as gyro rate, command rate, and pickoff angle—are fed into a digital system 24. The gyro and pickoff measurements are analog signals that must be converted to digital form by an analog to digital converter 26. (Note that there are two converters labeled 26 because both signals are multiplexed through the same converter.) The gyro signal is demodulated digitally by a demodulator 28 and sent into a compensator 30. The command rate is provided as a digital signal, therefore it is fed into the compensator directly. The output from the compensator 30 is converted to analog form by a digital to analog converter 32, leading to a torque that is applied to the mirror 34. As shown, the output from the mirror block 34 is fed via a feedback path 36 to the A/D converter 26, as the pickoff angle. The pickoff angle represents the angle of mirror 2 relative to sensor block 8. The gyro rate is measured from gyro 18. The command rate is derived from the gimbal commanded position.

Figure 3A:
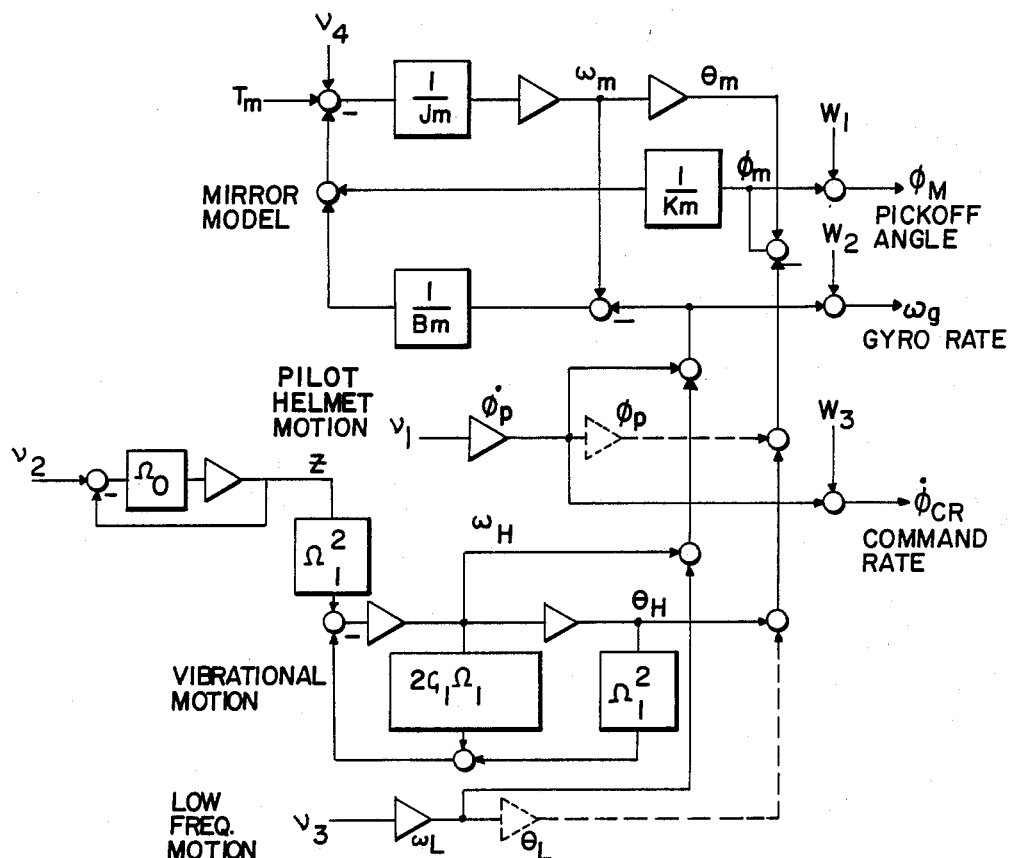
FIG. 3a is a design model block diagram for the elevation axis.
Figure 3B:
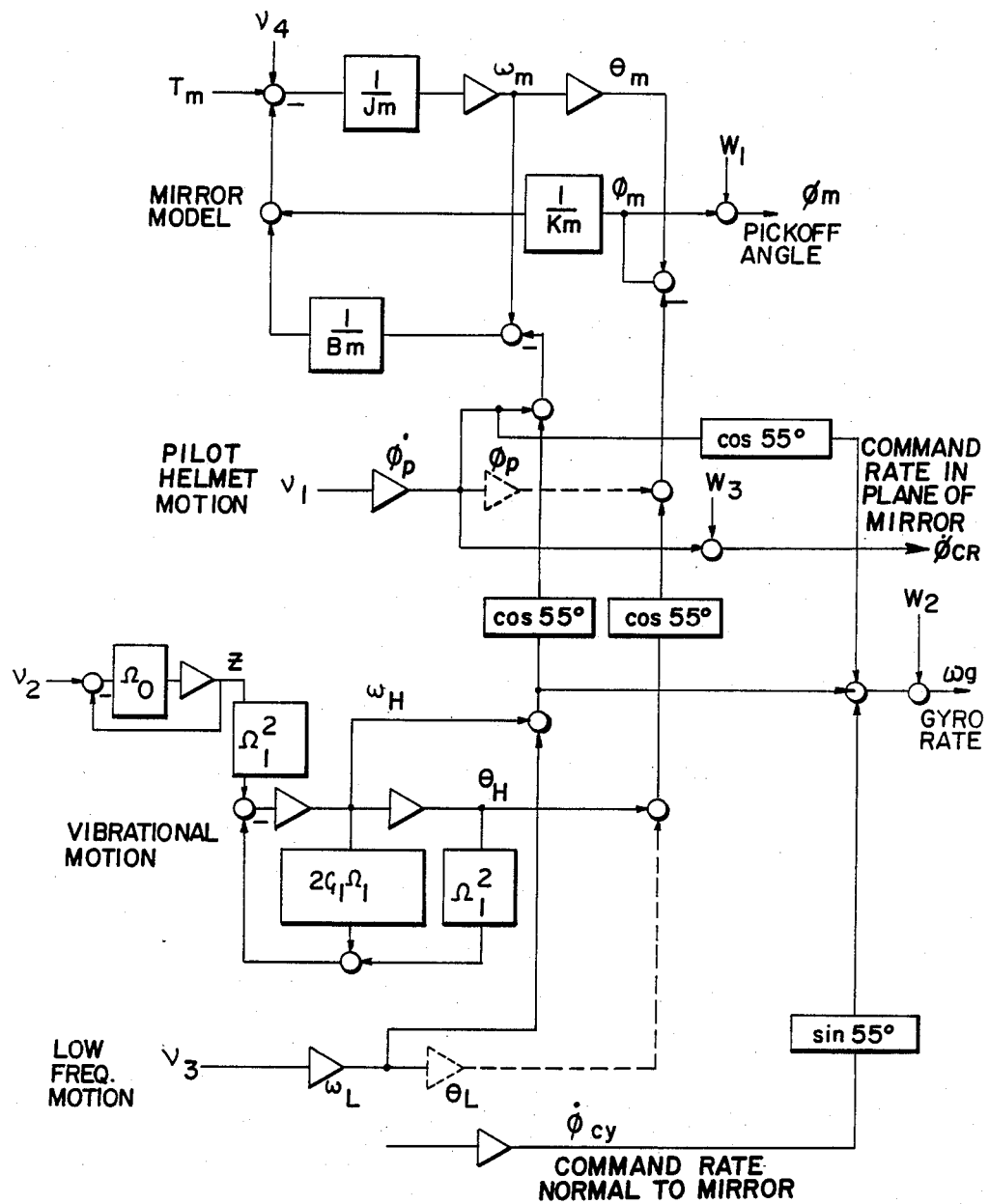
FIG. 3b is a design model block diagram for the azimuth axis.

Referring to FIGS. 3a and 3b, there are shown design models upon which compensator circuit 30 is based. The reason that two design models are needed is due to the fact that, as was mentioned previously, mirror stabilization subassembly 20 actually detects movements about two axes perpendicular to the line-of-sight. In other words, two independent compensator circuits for controlling mirror 2—about the elevation axis and the azimuth axis—are used. In essence, but for a small variation, both of the design models in FIGS. 3a and 3b are the same. Specifically, FIG. 3a corresponds to the elevation axis while FIG. 3b corresponds to the azimuth axis.

Referring to the design model of FIG. 3a, it can be seen that there are a number of random noises, plant noise signals $v_1$, $v_2$, $v_3$, and $v_4$, and measurement noises $w_1$, $w_2$, and $w_3$. The spectral densities of these random noises are parameters that are selected by the designer of the compensator. The high frequency rate of the vehicle (i.e., vehicle vibration) is represented by $\omega_H$ while the vehicle high frequency position is represented by $\Theta_H$. The $\Phi_P$ represents the pilot helmet rate relative to the vehicle. Parameters, $J_M$, $K_M$ and $B_M$ correspond to the inertia of the mirror, the stiffness of the spring connection between the mirror and the gimbal and the damping factor of the mirror, respectively. $\Omega_0$ and $\Omega_1$ represent the characteristic frequencies of the vibrational motion to be rejected and $\zeta_1$ is a damping factor.

From the FIG. 3a design model the following seven estimate states are ascertained:

$\Phi_M$ = pickoff angle $\omega_H$ = vehicle high frequency rate $\dot{\Phi}_P$ = gimbal rate relative to vehicle          (1)

$\Theta_H$ = vehicle high frequency position z = high frequency disturbance variable $\omega_L$ = vehicle low frequency rate $\omega_M$ = mirror inertial rate For the FIG. 3b design model of the azimuth axis upon which compensator circuit 30 is based, an additional factor needs to be taken into consideration. This is due to the fact that, for azimuth compensation, since the mirror is not parallel to the gyro axis and is instead tipped over, illustratively at 55°, an additional rate which has a component that falls along the gyro axis has to be taken into account. Accordingly, additional blocks containing both cosine 55° and sine 55° have been added. As a result, the gyro rate has the following relationship $$\omega_g = \omega_H + \omega_L + (\cos 55°)\dot{\Phi}_P + (\sin 55°)\dot{\Phi}_{CY} \quad (2)$$

where $\omega_g$=gyro rate
$\omega_H$=vehicle high frequency rate
$\omega_L$=vehicle low frequency rate
$\dot{\Phi}_P$=pilot helmet rate relative to the vehicle
$\dot{\Phi}_{CY}$=the command rate normal to the mirror, but along the Y axis.

With the FIG. 3b design model, the following seven estimated state variables are obtained:

$$\begin{aligned}&\Phi_M=\text{pickoff angle}\\&\omega_H=\text{vehicle high frequency rate}\\&\dot{\Phi}_P=\text{pilot helmet rate relative to vehicle}\\&\Theta_H=\text{vehicle high frequency position}\\&z=\text{high frequency disturbance variable}\\&\omega L=\text{vehicle low frequency rate}\\&\omega_M=\text{mirror inertial rate}\end{aligned} \quad (3)$$

And by using the well documented Riccati equations (see for example pages 343 to 347 of *Control System Design, An Introduction To State—Space Methods* by Bernard Friedland, McGraw-Hill Book Company, 1986), the respective sets of elevation and azimuth axis equations can be solved.

Figure 4:
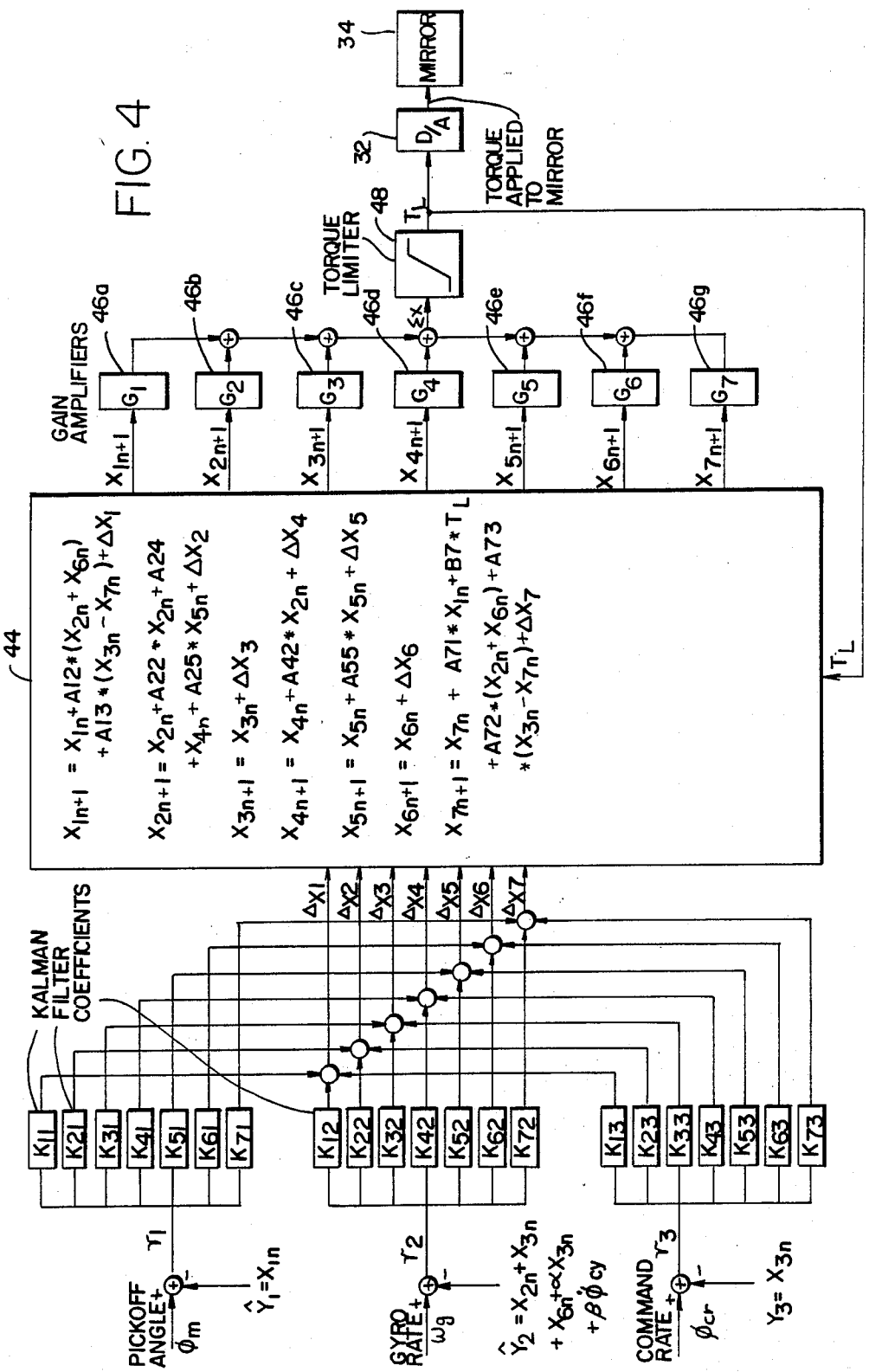
FIG. 4 is a compensator block diagram illustrating the generation from three input signals different compensator states and the mirror control torque.

Although there are two independent compensators, i.e., servo compensators for the elevation axis and the azimuth axis, to control mirror 2, both of these servo compensators, although employing different coefficients, are essentially identical in structure, as shown in FIG. 4. As was mentioned previously, the purpose of the image stabilization compensator circuits is to compute, in real time, the torques that are to be applied to the mirror so as to dynamically control its position.

FIG. 4 shows three input measurements. These input measurements are the inertial gyro rate $\omega_g$ (of sensor block 8 about the corresponding axis as measured by gyro 18), the command rate $\dot{\Phi}_{CR}$ and the pickoff angle measurement $\Phi_M$. In addition, estimated measurements $\hat{Y}_1$, $\hat{Y}_2$ and $\hat{Y}_3$ are summed with pickoff angle measurement $\Phi_M$, gyro rate $\omega_g$ and command rate $\dot{\Phi}_{CR}$, respectively.

The FIG. 4 mirror compensator block diagram is, as was mentioned before, representative of the elevation axis. And inasmuch as the azimuth axis is perpendicular to the line of sight and is not contained within the plane of mirror 2, the only difference between the azimuth axis mirror compensator block diagram and that of the elevation axis resides in the differences of parameters $\alpha$ and $\beta$ for the estimated gyro rate measurement $\hat{Y}_2$. For the azimuth axis, $\alpha$ and $\beta$ are related to sine 55° and cosine 55°, respectively. That is, $\alpha$ is equal to 1-cos 55° for the azimuth axis and is equal to 0 for the elevation axis; and $\beta$ is equal to sine 55° for the azimuth axis and is equal to 0 for the elevation axis.

Continuing with FIG. 4, it can be seen that the respective estimated measurements are subtracted from the actual measurements to yield residual measurements $r_1$, $r_2$ and $r_3$. For example, the actual pickoff angle measurement $\Phi_M$ has subtracted therefrom estimated measurement $\hat{Y}_1$, which is equal to $X_{ln}$, to yield $r_1$. Likewise, the actual gyro rate measurement $\omega_g$ has subtracted therefrom the estimated measurement $\hat{Y}_2$ to yield residual measurement $r_2$; while command rate $\dot{\Phi}_{CR}$ has subtracted therefrom the estimated measurement $\hat{Y}_3$ to yield residual measurement $r_3$.

With respect to the estimated measurement $\hat{Y}_2$, it should be appreciated that the term $\dot{\Phi}_{CY}$ is but one of three components for the command rate, that is, a transformation of the command rate from the azimuth and elevation axes to the mirror axis. The other two components for the mirror axis are $\dot{\Phi}_{CX}$ and $\dot{\Phi}_{CZ}$, representing the command rate for the elevation and the azimuth axes, respectively.

Returning to FIG. 4, residuals $r_1$ to $r_3$ are shown to be multiplied by twenty-one coefficients, $K_{11}$ to $K_{73}$, separated into three corresponding coefficient sets from $K_{11}$ to $K_{71}$, $K_{12}$ to $K_{72}$ and $K_{13}$ to $K_{73}$. These coefficients are Kalman filter coefficients which are well known and are disclosed, for example, from pages 415 to 417 of the above-noted *Control System Design* book. In essence, these Kalman filter coefficients are gain coefficients; and when the residuals are multiplied with the respective sets of gain coefficients, a set of seven estimated state correction terms $\Delta x_1$ to $\Delta x_7$ are generated. These correction terms are fed to a block 44 which represents the state equation comprising seven equations governing the evolution of the seven state estimates, represented by $x_{1n+1}$ to $X_{7n+1}$. These seven equations in fact correspond to the earlier discussed variables of the equations relating to the FIGS. 3a and 3b design models.

From the seven state equations of state equation block 44 seven states $X_{1n+1}$ to $X_{7n+1}$ are computed. These states are multiplied by seven gains 46a to 46g, having corresponding gain coefficients $G_1$ to $G_7$. The thus amplified states are then summed, as signal $\Sigma X$, and fed to a torque limiter 48, which, as is well known, limits the control torque within predetermined upper and lower limits. The output signal provided from torque limiter 48 is designated as $T_L$ and is applied to mirror 2, fed back to compensator circuit 44 and used as one of the variables for calculating equation $X_{7n+1}$.

From the above discussion, it should be appreciated that servo compensator circuit 44 is unique in that it achieves a frequency dependent performance requirement. Putting it differently, in the high frequency regime, for example a frequency range that is greater than 5Hz, state equation block 44 stabilizes the line of sight LOS relative to inertial space; while in the low frequency regime, i.e., a low frequency range of less than 5Hz, state equation block 44 causes the line of sight to track the commanded motion. From FIG. 4, it can further be seen that a torque signal $T_L$ is fed to digital to analog converter 32, whose output after amplification, drives to mirror torquer.

Figure 5:
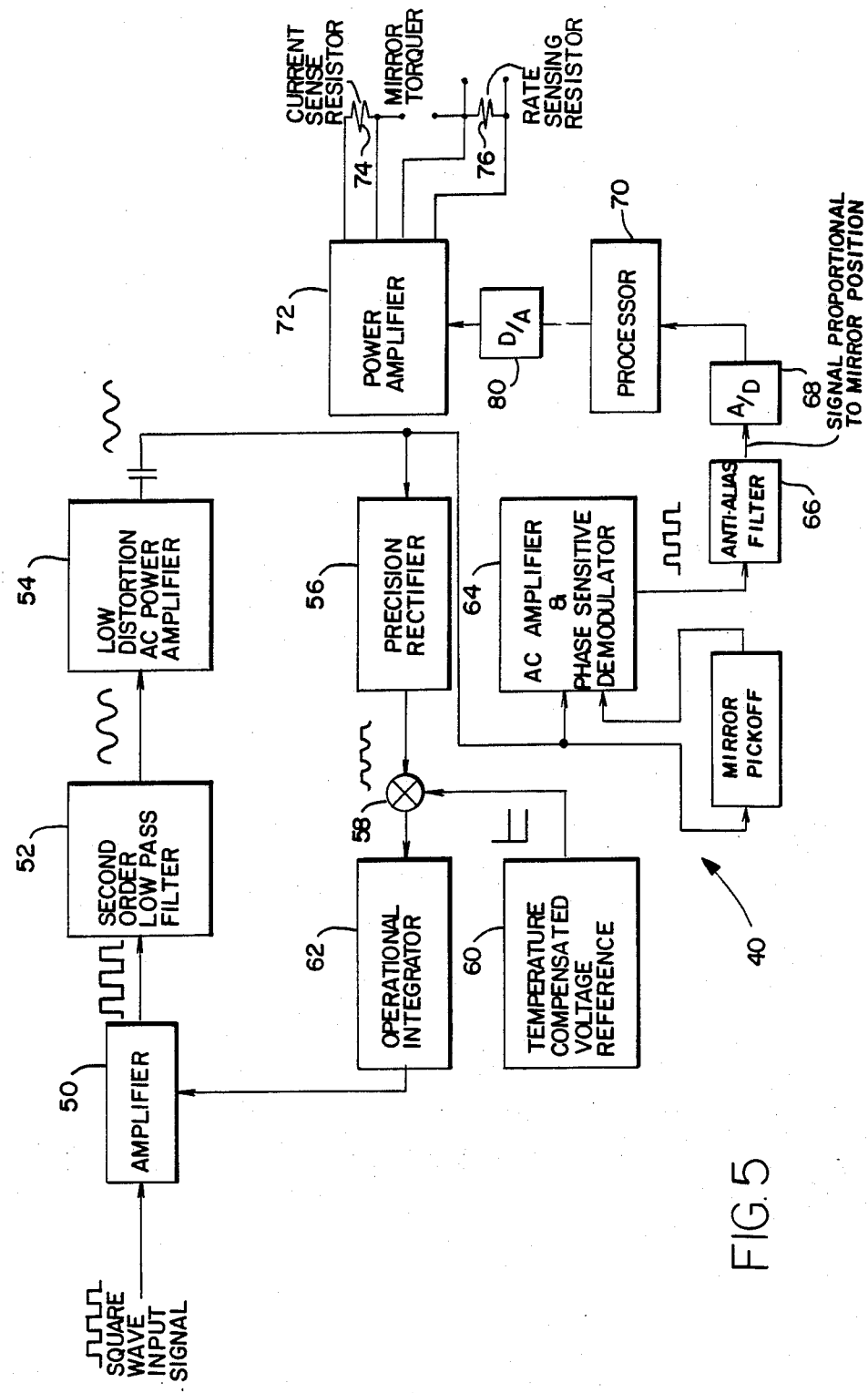
FIG. 5. is a block diagram which explains the relationship between the generated mirror torquer command signal and the torquing of the mirror in the image stabilization subassembly.

Referring to FIG. 5, there is shown a block diagram of the hybrid mirror servo loop electronic circuit used to process the position signals generated from the pickoff sensors. For this invention, mirror 34 may be equated with the FIG. 5 block diagram.

The hybrid servo loop circuit of FIG. 5 operates as follows. Appreciating that the square wave signal from converter 32 is at TTL level and has been divided down from a crystal oscillator to 19.2kHz, it can be seen that the square wave signal is fed to an amplifier 50 which has an open collector output. The supply voltage for the output stage of amplifier 50 is furnished from an operational integrator 62, to be discussed later. Consequently, the amplitude of the square wave signal provided at the output of amplifier 50 is determined by the magnitude of the output from integrator 62. The thus amplified signal is transmitted to a second order low pass filter 52, resulting in a sine wave being provided at the output thereof. This sinusoidal signal is fed to a low distortion ac power amplifier 54; and the power thus amplified is rectified by a precision rectifier 56 and sent to a summer 58.

Concentrating for the moment on summer 58, it can be seen that the rectified signal is compared with a reference level signal generated from a stable temperature compensated voltage reference source 60, which may comprise a Zener reference diode. The difference signal is then fed as an error signal to operational integrator 62 whose output, as discussed previously, determines the level of the square wave signal, from amplifier 50, fed to low pass filter 52. Thus, the amplitude of the sinusoidal output signal is carefully maintained.

The sinusoidal voltage is used to excite a two-axis pickoff circuit which develops signals proportional to the mirror displacement from its null position about two orthogonal axes. These displacement signals are fed to two amplifier demodulators 64 (one per axis). There the mirror position pickoff signal is amplified and demodulated so as to form a dc signal proportional to the mirror "hangoff" from its null position. The thus demodulated signal is next processed by an anti-alias filter 66 and sent to an analog to digital converter 68. The thus digitized signal is fed to a processor 70 where the required phase compensation is done digitally. The compensated signal is, in order for it to operate as a torquing signal, converted by a digital to analog converter 80 into an analog signal, which is fed to a power amplifier 72.

It should be appreciated that all of the components discussed with respect to the FIG. 5 block diagram are conventional components.

In sum, by utilizing the mirror assembly of FIG. 1 and feeding the pickoff angle and gyro rate signals measured from the mirror assembly, together with a command rate signal measured from the movement of the helmet worn by a pilot, to compensator circuits and subtracting from these measurements estimated measurements obtained from design models, an accurate torque signal for the mirror is generated. To ensure that the mirror torque signal maintains its accuracy, it is continuously fed back to the compensator circuits and updated. Consequently, the mirror torque signal is used, in real time, to accurately torque the mirror of the assembly for rejecting aircraft vibrations, thereby providing true tracking of aircraft maneuvers and also eliminating the blurring of the view screen which, prior to the instant invention, pilots of aircraft are subjected to. As for the compensator circuits, it should be appreciated that these circuits correspond to both the elevation axis and the azimuth axis of the mirror assembly, since the assembly is aligned along the commanded line of sight and therefore is perpendicular to both the elevation and azimuth axes thereof.

While a preferred embodiment of the invention is disclosed herein for purposes of explanation, numerous changes, modifications, variations, substitutions and equivalents in whole or in part, should now be apparent to those skilled in the art to which the invention pertains. Accordingly, it is intended that the invention be limited only by the spirit and scope of the appended claims.

We claim:

1. In an optical stabilizing system having an assembly for tracking a command line of sight and rejecting environmental perturbations, the line of sight being chosen in accordance with an input command signal, the assembly comprising:
    a mirror;
    a rigid block;
    means flexibly coupling the mirror to the rigid block, the flexible coupling means providing two axes of freedom for the mirror;
    gyroscopic means mounted to the rigid block, the spin axis of the gyroscopic means being aligned along the line of sight, the gyroscopic means providing a gyro rate signal about two axes perpendicular to the line of sight;
    means for torquing the mirror;
    means for sensing the movement of the mirror and providing a feedback pickoff signal corresponding thereto; and
    control means for receiving the command signal, the gyro rate signal and the feedback pickoff signal and, based on these signals, providing a torquer signal to the torquing means for torquing the mirror; whereby the torquer signal is responsive for cancelling the environmental perturbations and torques the mirror only to track the command line of sight.

2. The assembly according to claim 1, wherein the flexible coupling means comprises a flexure hinge having movement about two axes.

3. The assembly according to claim 1, wherein the rigid block is secured to gimbals and is part of an image capture and display system for a vehicle.

4. The assembly according to claim 1, wherein the torquing means comprises at least a pair of torquer coils, and wherein the sensing means comprises a plurality of pickoff coils.

5. The assembly according to claim 1, wherein the control means comprises at least one compensator circuit for converting the command signal, the gyro rate signal and the feedback pickoff signal into a plurality of estimated states to be used to generate the output torquer signal, the estimated states including parameters to match the environmental perturbations, wherein the estimated states comprise a pickoff angle corresponding to the position of the mirror relative to a base, a high frequency rate for the vehicle to which the assembley is mounted, a gimbal rate relative to the vehicle, a high frequency position for the vehicle, a high frequency disturbance variable, a low frequency rate for the vehicle and an inertial rate of the mirror.

6. The assembly according to claim 5, wherein the control means further comprises a torque limiter connected to the compensator circuit for receiving the torquer signal, the torque limiter confining the magnitude of the torquer signal within predetermined levels so as to prevent the mirror from being torqued excessively.

7. The assembly according to claim 1, wherein the command signal is provided as an input from a helmet worn by a pilot and wherein the line of sight moves in accordance with the movement of the helmet.

8. The assembly according to claim 1, wherein the control means comprises compensator circuits for elevation and azimuth axes perpendicular to the command line of sight, both elevation and azimuth compensator circuits generating torquer signals for torquing the mirror along the elevation and azimuth axes.

9. The assembly according to claim 8, wherein the measurement of the respective elevation and azimuth axes are fed to the corresponding compensator circuit; and wherein each output torquer signal is a sum of a plurality of estimated states provided as outputs from the corresponding compensator circuit and multiplied with a plurality of gain coefficients.

10. The assembly according to claim 1, wherein the mirror torquing means comprises.

means for amplifying the torquer signals;
means for filtering the amplified torquer signal;
means for maintaining a particular amplitude for the amplified torquer signal;
means for processing the amplified torquer signal; and
means for using the processed torquer signal to drive torquer coils in the assembly for maintaining the mirror in its null position. thereby rejecting the environmental perturbations.

11. In an optical stabilizing system having an assembly including a mirror, a method of torquing the mirror to track a command line of sight relative to a moving reference and to track the moving reference and to reject environmental perturbations, the method comprising the steps of:

flexibly coupling the mirror to a rigid block so as to provide two axes of freedom for the mirror;
mounting a gyroscopic means to the rigid block;
stabilizing the line of sight relative to an input command signal;
aligning the spin axis of the gyroscopic means along the line of sight, thereby enabling the gyroscopic means to provide a gyro rate signal about two axes perpendicular to the line of sight;
sensing the movement of the mirror and providing a feedback signal corresponding thereto;
transforming the input command signal, the gyro rate signal and the feedback signal into a plurality of estimated states;
combining the estimated states to produce an output torquer signal responsive to canceling the environmental perturbations and tracking the line of sight; and
torquing the mirror in accordance to the torquer signal to track the command and stabilize line of sight.

12. The method according to claim 11, further comprising the step of securing the rigid block to gimbals to form an image capture and display system for a vehicle.

13. The method according to claim 11, wherein the transforming step further comprises the step of:

transfer functioning the input command, gyro rate and feedback signals into the following estimated states:

(a) a pickoff angle corresponding to the position of the mirror relative to a base;
(b) a high frequency rate for the vehicle on which the assembly is mounted to;
(c) a gimbal rate relative to the vehicle;
(d) a high frequency position for the vehicle;
(e) a high frequency disturbance variable;
(f) a low frequency rate for the vehicle; and
(g) an inertial rate of the mirror.

14. The method according to claim 13, further comprising the step of:

limiting the magnitude of the torquer signal to prevent the mirror from being excessively torqued and to provide a compensator with torque information consistent with the actual torque applied.

15. The method according to claim 11, wherein the transforming step further comprises the steps of:

generating estimated measurement signals; and
subtracting the estimated measurement signals from the input command, gyro rate and feedback signals to produce residual signals.

16. The method according to claim 15, further comprising the steps of:

multiplying the residual signals with a plurality of gain coefficients to generate a plurality of correction terms;
using the correction terms to generate a plurality of corrected estimate states; and
multiplying the corrected estimate states with corresponding gain coefficients to generate the torquer signal.

17. The method according to claim 11, wherein the torquing step further comprises:

maintaining the mirror in its null position, environmental perturbations notwithstanding, to track the command line of sight.

* * * * *